US008788117B2

(12) United States Patent
Frings et al.

(10) Patent No.: US 8,788,117 B2
(45) Date of Patent: Jul. 22, 2014

(54) METHOD FOR MOVING AN AIRCRAFT ALONG THE GROUND

(75) Inventors: Carsten Frings, L'Union (FR); Christophe Cros, L'Union (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 357 days.

(21) Appl. No.: 13/124,711

(22) PCT Filed: Oct. 22, 2009

(86) PCT No.: PCT/FR2009/052026
§ 371 (c)(1),
(2), (4) Date: Jun. 15, 2011

(87) PCT Pub. No.: WO2010/046603
PCT Pub. Date: Apr. 29, 2010

(65) Prior Publication Data
US 2011/0259995 A1    Oct. 27, 2011

(30) Foreign Application Priority Data

Oct. 23, 2008  (FR) ..................................... 08 57199

(51) Int. Cl.
*G05D 1/00*    (2006.01)
(52) U.S. Cl.
USPC ..................................... 701/2; 244/3; 244/50
(58) Field of Classification Search
USPC .......................................... 701/2; 244/3, 50
See application file for complete search history.

(56) References Cited

U.S. PATENT DOCUMENTS

| | | | | | |
|---|---|---|---|---|---|
| 2,432,408 | A | * | 12/1947 | Glasgow et al. | 244/102 R |
| 2,477,569 | A | * | 8/1949 | Beirise | 280/446.1 |
| 2,502,522 | A | * | 4/1950 | Hoobler | 244/50 |
| 2,502,802 | A | * | 4/1950 | Sievers | 244/102 R |
| 2,580,064 | A | * | 12/1951 | Albright | 244/50 |
| 2,591,839 | A | * | 4/1952 | Levy | 60/416 |
| 2,622,827 | A | * | 12/1952 | Hayman et al. | 244/50 |
| 2,941,611 | A | * | 6/1960 | Norrie | 180/234 |
| 3,002,292 | A | * | 10/1961 | Cohen et al. | 434/30 |

(Continued)

FOREIGN PATENT DOCUMENTS

| | | |
|---|---|---|
| CN | 2092490 U | 1/1992 |
| CN | 2416046 Y | 1/2001 |

(Continued)

OTHER PUBLICATIONS

Merriam-Webster's Collegiate Dictionary 10$^{th}$ Edition, Merriam-Webster, Inc., 1993, all pages.*

(Continued)

*Primary Examiner* — Calvin Cheung
(74) *Attorney, Agent, or Firm* — Oliff PLC

(57) ABSTRACT

The invention relates to a method according to which an aircraft (10) is moved along the ground by means of at least two separate appliances (12) connected to the aircraft independently from each other or other appliances.
A control element is provided for moving an aircraft, said element sending instructions to at least two separate appliances in order to move the aircraft along the ground by means of the appliances.
The invention also relates to an appliance (12) for implementing the method according to the invention, which can communicate with an identical appliance in order to transmit and/or receive at least one datum relating to a position and/or a movement of one of the appliances.

10 Claims, 2 Drawing Sheets

(56) References Cited

U.S. PATENT DOCUMENTS

| | | | |
|---|---|---|---|
| 3,005,510 A | | 10/1961 | Phillips |
| 3,015,509 A | | 1/1962 | Bollmeier |
| 3,025,922 A | | 3/1962 | Savidge |
| 3,078,942 A | * | 2/1963 | Wiebe ........................ 180/14.7 |
| 3,526,375 A | * | 9/1970 | Stearman ................ 244/102 R |
| 3,532,307 A | * | 10/1970 | Larson .................... 244/102 SS |
| 3,746,473 A | * | 7/1973 | DeLancey et al. .............. 417/38 |
| 3,762,670 A | * | 10/1973 | Chillson ........................ 244/50 |
| 3,815,262 A | * | 6/1974 | Patterson et al. ................ 434/35 |
| 3,895,767 A | * | 7/1975 | Maughlin et al. ................ 244/3 |
| 3,938,759 A | * | 2/1976 | Bastide ............................ 244/9 |
| 4,225,279 A | * | 9/1980 | Boyer .......................... 414/428 |
| 4,318,448 A | * | 3/1982 | Cline .......................... 180/14.1 |
| 4,529,152 A | * | 7/1985 | Bernard ........................ 244/116 |
| 4,702,438 A | * | 10/1987 | Levy et al. .............. 244/104 FP |
| 4,892,269 A | * | 1/1990 | Greco et al. ................ 244/53 R |
| 5,054,714 A | * | 10/1991 | Franken et al. ................. 244/50 |
| 5,078,340 A | * | 1/1992 | Anderberg ...................... 244/50 |
| 5,100,082 A | * | 3/1992 | Archung ...................... 244/78.1 |
| 5,337,976 A | * | 8/1994 | Derrien .................... 244/102 A |
| 5,549,436 A | * | 8/1996 | Fresia .......................... 414/426 |
| 5,562,388 A | | 10/1996 | Le Gall et al. |
| 6,027,070 A | * | 2/2000 | Zambelli ................... 244/102 R |
| 6,305,484 B1 | * | 10/2001 | Leblanc ........................ 180/167 |
| 6,575,405 B2 | * | 6/2003 | Bryant et al. ........... 244/102 SL |
| 6,600,992 B2 | * | 7/2003 | Dow .............................. 701/23 |
| 6,604,707 B2 | * | 8/2003 | McVaugh ...................... 244/50 |
| 6,641,085 B1 | * | 11/2003 | Delea et al. .................... 244/50 |
| 6,792,844 B1 | * | 9/2004 | Gedge et al. .................... 91/436 |
| 7,581,603 B2 | * | 9/2009 | Hammonds ................ 180/6.48 |
| 7,975,959 B2 | * | 7/2011 | Perry et al. ...................... 244/50 |
| 8,181,725 B2 | * | 5/2012 | Andres et al. ................ 180/14.7 |
| 2003/0188529 A1 | * | 10/2003 | Collet et al. .................... 60/405 |
| 2005/0011991 A1 | * | 1/2005 | Ducos et al. .............. 244/102 R |
| 2005/0023798 A1 | * | 2/2005 | Gross .......................... 280/475 |
| 2005/0247824 A1 | * | 11/2005 | Allison, Sr. ................ 244/137.2 |
| 2006/0065779 A1 | * | 3/2006 | McCoskey et al. ....... 244/100 R |
| 2007/0101721 A1 | * | 5/2007 | Dooley et al. ................... 60/721 |
| 2007/0150119 A1 | * | 6/2007 | Mitchell et al. ................... 701/1 |
| 2007/0282491 A1 | * | 12/2007 | Cox et al. .......................... 701/3 |
| 2008/0083851 A1 | | 4/2008 | Perry et al. |
| 2008/0087766 A1 | * | 4/2008 | Leutard et al. ............ 244/102 R |
| 2008/0217466 A1 | * | 9/2008 | Bhargava ........................ 244/50 |
| 2008/0283661 A1 | * | 11/2008 | Henley ...................... 244/114 R |
| 2009/0261197 A1 | * | 10/2009 | Cox et al. ........................ 244/50 |
| 2010/0096494 A1 | * | 4/2010 | Braier et al. .................... 244/50 |
| 2010/0217456 A1 | * | 8/2010 | Edelson et al. ................... 701/2 |
| 2011/0073388 A1 | * | 3/2011 | Andres et al. ................ 180/14.7 |
| 2012/0018574 A1 | * | 1/2012 | Bayer ............................. 244/50 |

FOREIGN PATENT DOCUMENTS

| | | |
|---|---|---|
| CN | 2458238 Y | 11/2001 |
| CN | 2558585 Y | 7/2003 |
| DE | 10 2008 035 342 A1 | 2/2010 |
| EP | 0 582 204 A1 | 2/1994 |
| EP | 1 634 808 A1 | 3/2006 |
| FR | 2 675 919 A1 | 10/1992 |
| WO | WO 93/18967 A1 | 9/1993 |
| WO | WO 03/078250 A1 | 9/2003 |
| WO | WO 2010/012261 A2 | 2/2010 |

OTHER PUBLICATIONS

"Unmanned—definition of unmanned by the Free Online Dictionary", all pages, date unknown. Retrieved from http://www.thefreedictionary.com/unmanned.*

"How Towbot Works", tracetowbots.com, all pages, Sep. 22, 2012. Retrieved from Wayback Machine http://web.archive.org/web/20120922233153/http://www.tracetowbots.com/how-it-works.*

International Search Report issued in PCT/FR2009/052026 dated Apr. 27, 2010.

Feb. 26, 2013 Chinese Office Action issued in Chinese Application No. 200980152129.1 (with translation).

* cited by examiner

METHOD FOR MOVING AN AIRCRAFT ALONG THE GROUND

FIELD OF THE INVENTION

The invention relates to moving aircraft along the ground, in particular before take-off and after landing.

BACKGROUND OF THE INVENTION

An aircraft frequently needs to reverse to leave its parking point. However, its engines cannot generally accomplish this movement independently. A known method is therefore to push the aircraft using a tractor from its parking point, reversing it to a position from which it can move independently using its engines alone. This operation is usually called "pushback". Systems used to tow aircraft along the ground are for example described in documents U.S. Pat. Nos. 3,025,922, 3,015,509 and 3,005,510. The tractor is controlled by a pilot onboard the appliance or controlling the appliance remotely. The tractor is generally connected to the nose landing gear of the aircraft in order to move it.

However, the nose landing gear is not originally designed for this type of operation. The stresses generated in the landing gear while moving the aircraft could cause fatigue and considerably reduce its lifetime. Consequently, this increases the risk of nose landing gear failure. Obviously, the nose landing gear could be reinforced to prevent these risks, but this will increases the weight of the aircraft and therefore the fuel consumption in flight. Whatever the case, the cost of reinforcing or replacing the nose landing gear is prohibitive.

In addition, the possibilities for moving the aircraft using the tractor remain limited. For example, the aircraft cannot take certain types of turn. Similarly, the aircraft cannot make a 180° turn on the spot. Moreover, the tractor is difficult to control, an error in the tractor trajectory leading to a greater error in the trajectory followed by the aircraft.

OBJECT AND SUMMARY OF THE INVENTION

One objective of the invention is to simplify movement of aircraft along the ground without using their engines.

Thus, the invention provides for a method to move an aircraft, wherein the aircraft is moved along the ground by means of at least two separate appliances connected to the aircraft independently from each other or other appliances.

Moving the aircraft by means of at least two appliances therefore offers greater flexibility for maneuvering the aircraft. There are more movement possibilities and the aircraft can now make tight turns and even make a 180° turn on the spot. It therefore becomes possible to maneuver an aircraft, even one of large dimensions, on most runways or taxiways, which is not always currently possible. In addition, use of at least two appliances reduces the stresses on each part of the aircraft (such as the landing gear) to which they are connected, by distributing these stresses, as compared with connection to a single landing gear. Moreover, if one of the two appliances breaks down during the maneuver, the other appliance can continue all or part of the maneuver. Lastly, although tractors are currently qualified for a given aircraft so that their dimensions are compatible with that of the aircraft, use of at least two appliances could reduce, or even eliminate, this constraint. The number of different types of appliance required on a given airport platform is therefore reduced.

Advantageously, one part of the aircraft, such as a landing gear, is moved forward by one of the appliances, and another part of the aircraft, such as a landing gear, is moved backward by another one of the appliances.

These maneuvers allow the aircraft to pivot on the spot, for example to make a 180° turn.

Preferably, the aircraft is moved by means of at least one landing gear other than the nose landing gear.

The main landing gears of the aircraft are in fact generally stronger than the nose landing gear. This therefore avoids placing too much stress on the nose landing gear and having to reinforce it in order to maneuver it.

Advantageously, the speed of one of the appliances is different from that of the other appliance or one of the other appliances.

In particular, this allows the aircraft to turn as it moves along the ground.

Preferably, at least one of the appliances is controlled according to at least one datum relating to a position and/or a movement of the other appliance or of at least one of the other appliances.

Advantageously, movement of the aircraft by means of the appliances is controlled from inside the aircraft, preferably from a cockpit of the aircraft.

Traditional movement involves in fact three persons: the controller, the aircraft pilot and the tractor driver. However, communication between three people may lead to misunderstandings which could lead to safety risk. Procedures state that the pilot is responsible for the aircraft, even when it is maneuvered by means of an appliance on the ground. If the appliances are controlled from inside the aircraft, especially by the pilot, the aircraft movements are controlled more efficiently.

Advantageously, the aircraft is braked using at least one of the appliances.

Advantageously, at least one of the appliances:
detects when a front wheel of the aircraft turns; and
modifies its position and/or its movement according to this action.

The appliance is therefore controlled according to the movement or position of the front wheel. We can therefore plan that the pilot on board the aircraft simply has to move this wheel for the appliances to correctly interpret the required action and move the aircraft in the direction corresponding to this orientation.

Advantageously, at least one of the appliances:
detects presence of a landing gear of the aircraft; and
depending on this detection, moves to take up a position in which it can move the aircraft.

Control of the operation to couple the appliances to the aircraft is therefore automated in order to simplify and speed up handling of the aircraft after landing.

Preferably, at least one of the appliances:
detects that one of the aircraft engines has started; and
due to this detection, moves away from the aircraft.

The command for separating the appliance from the aircraft is therefore automated and there is no chance of the appliances remaining near the aircraft too long once the engines have started. This increases the safety of the aircraft and the appliances.

Preferably, at least one of the appliances determines its position in a predetermined airport zone, for example by means of ground beacons or satellites.

These positioning means improve the operating safety. In particular, they prevent the risks of collision between vehicles moving in the zone, for example several appliances or several aircraft moved by appliances. The two positioning means, ground beacon or satellites, can in fact be used redundantly.

Preferably, after moving the aircraft by means of the appliances via an aircraft wheel or landing gear, the wheel or landing gear is filmed.

It is therefore possible to check that the wheel or landing gear has not been damaged during the movement along the ground.

Preferably, when the aircraft is moving along a complete path from a parking position to a take-off and/or landing runway, respectively the opposite, the aircraft is moved by means of the appliances from the parking position up to an intermediate position, respectively the opposite, such that the length of a partial path of the aircraft from the intermediate position to the runway, respectively the opposite, is less than half the length of the complete path and, preferably, less than 25% of its length.

Consequently, the aircraft is moved for most of the distance from its parking point to the take-off runway by the appliances, thereby reducing pollution, fuel consumption and noise.

Preferably, at least one of the appliances is parked in a parking zone separated from the closest take-off and/or landing runway by a distance of less than half the length of the runway, preferably less than 20% of this length.

Parking the appliances in this zone therefore reduces their traffic and the risks of collision between the appliances or between the appliances and other vehicles. In addition, more appliances can be available immediately when numerous aircraft have to be handled successively at the exit of the runway after landing.

Preferably, the parking zone or at least one of the parking zones is closer to an exit corridor of the runway than to an entry corridor of the runway.

The path of each appliance to handle an aircraft is therefore particularly short, which reduces the time the aircraft has to wait before being handled after landing.

Advantageously, the appliance is supplied with energy on the parking zone.

Preferably, the appliances connected to the aircraft are driven to a position that is closer to an entry corridor of a take-off runway than to an exit corridor of the runway and, once the appliances have been separated from the aircraft, the appliances are driven to a position that is closer to an exit corridor of a landing runway than to an entry corridor of this runway.

After moving the aircraft to the take-off runway, the appliances will move to a position where they are available to handle an aircraft which has just landed and move it to its parking point. Consequently, each appliance does not return to the air terminal after taking the aircraft to the take-off runway and as a result does not congest the airport infrastructure near the air terminal. In addition, the path of the appliance after separation will generally be shorter than a return path to the air terminal, which limits the movements and energy consumption of the appliance. The appliances and their operators if any therefore dedicate a larger proportion of their activity to moving aircraft compared with the situation in the prior art. As a corollary, a smaller proportion of their activity is dedicated to moving the appliances under no load in the airport zone. Use of the appliances is therefore optimized without congesting the traffic in the zone or generating additional cost.

Preferably, since the aircraft is moved along an aircraft route, each appliance after separation is driven along an appliance route different from the aircraft route, preferably on a road dedicated to appliances and/or parallel to the runway.

Advantageously, each appliance is driven from a position that is closer to an entry corridor of a take-off runway than to an exit corridor of the runway to a position that is closer to an exit corridor of a landing runway than to an entry corridor of the landing runway, and after connecting the appliance to an aircraft, the appliance is driven from the latter position.

Preferably, the aircraft is moved during a complete path of the aircraft from the landing runway to a parking position, and such that the length of a partial path of the aircraft from the runway to the position that is closer to the exit corridor of the landing runway than to the entry corridor is less than half the length of the complete path and preferably less than 25% of this length.

The invention also provides for a computer program comprising instructions that can control execution of the steps of a method according to the invention when it is executed on a computer.

The invention also provides for a data storage medium including such program in saved format and provision of such program on a telecommunication network for downloading.

The invention also provides for an appliance for implementing a method according to the invention, which can communicate with an identical appliance in order to transmit and/or receive at least one datum relating to a position and/or a movement of one of the appliances.

Advantageously, the appliance can detect that an engine of an aircraft being moved by the appliance has started and, due to this detection, control a movement of the appliance away from the aircraft.

Advantageously, the appliance can detect presence of an aircraft landing gear in a predetermined zone away from the appliance and, further to this detection, take up a position where it can move the aircraft.

Preferably, the appliance comprises means to detect when a nose wheel of the aircraft turns and to modify a position and/or a movement of the appliance according to this detection.

Advantageously, at least one of the appliances communicates with the other appliance or at least one of the other appliances to transmit and/or receive at least one datum relating to a position and/or a movement of one of the appliances.

Preferably, the appliance comprises means to brake the aircraft while it is being moved by the appliance. Obviously, the aircraft keeps its own braking means which can be actuated if necessary.

Advantageously, at least one of the appliances comprises at least one camera that can film a zone where the appliance is approaching a wheel of the aircraft or film towards the aircraft when it is moved by the appliance.

In the first case, the camera can check that the landing gear or wheel used by the appliance to move the aircraft is in good condition. In the other case, the camera can give the operator controlling the movement of the aircraft, in particular the pilot, an image of the trajectory.

Preferably, the appliance can determine its position in a predetermined zone, for example by means of beacons or satellites.

The invention also provides for a control element for moving an aircraft, capable of sending commands to at least two separate appliances in order to move the aircraft along the ground by means of the appliances.

Preferably, the element can control at least one the appliances according to at least one datum relating to a position and/or a movement of the other appliance or of at least one of the other appliances.

The movements of the two appliances are therefore well coordinated and the movement of the aircraft can be controlled by means of a single command instruction transmitted to the control element.

The invention also provides for an aircraft which comprises a control element according to the invention.

Lastly, the invention provides for an airport zone which comprises:
- a take-off runway;
- a landing runway possibly the same as the take-off runway; and
- at least one road dedicated to the appliances used to move the aircraft and extending from a position that is closer to the entry corridor of the take-off runway than to the exit corridor of this runway up to a position that is closer to an exit corridor of the landing runway than to an entry corridor of this runway.

Preferably, the zone comprises a parking zone for the appliances, separated from the runway or one of the runways by a distance of less than half the length of this runway, preferably less than 20% of this length, and preferably comprising in the zone permanent means to supply energy to the appliances.

BRIEF DESCRIPTION OF THE DRAWINGS

Other characteristics and advantages of the invention will appear on reading the following description of a preferred embodiment and variants given as non-limiting examples, and referring to the attached drawings in which.

MORE DETAILED DESCRIPTION

Figure 1:
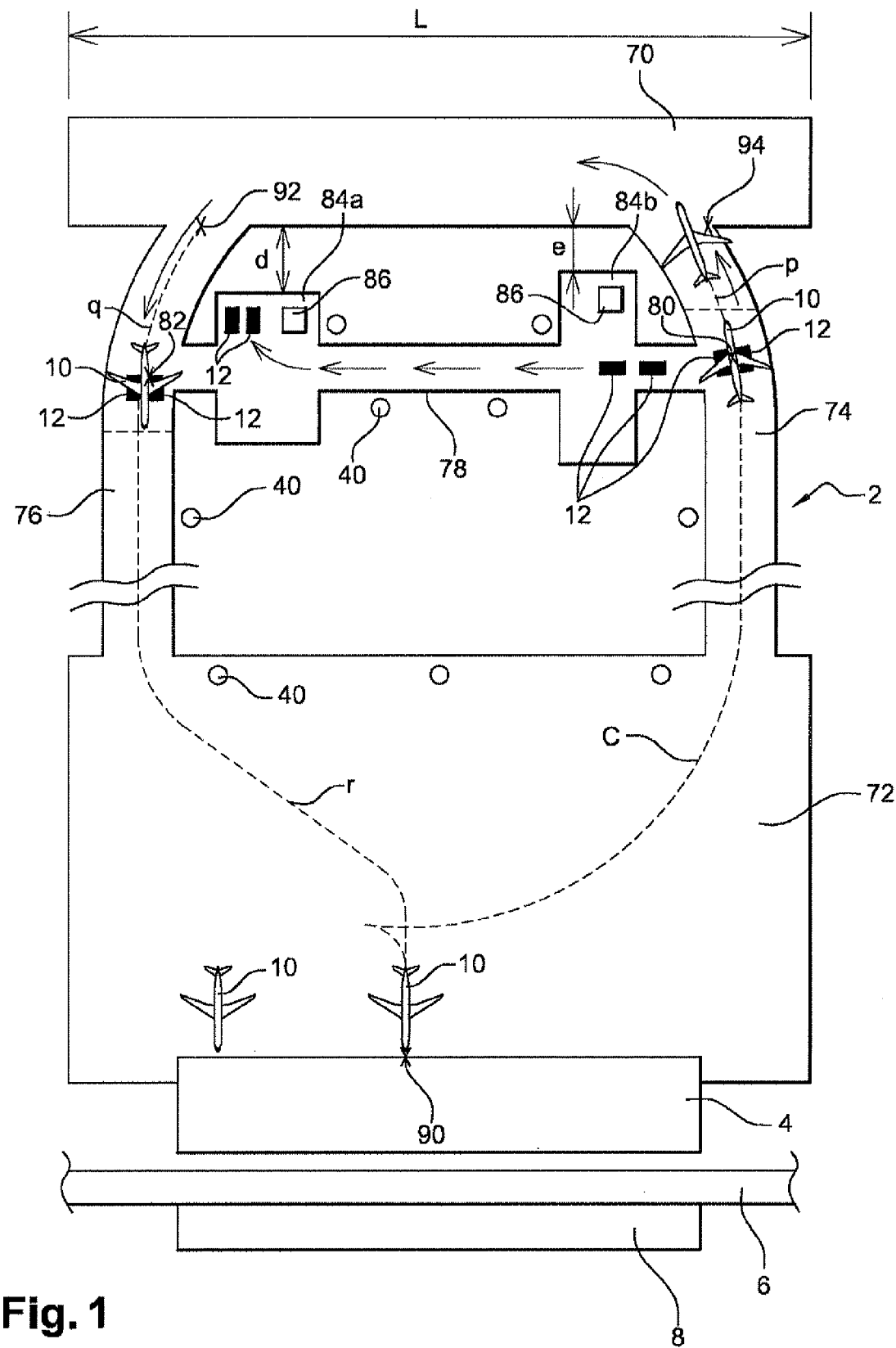
FIG. 1 is a plan view of an airport zone illustrating the implementation of the invention.
Figure 4:
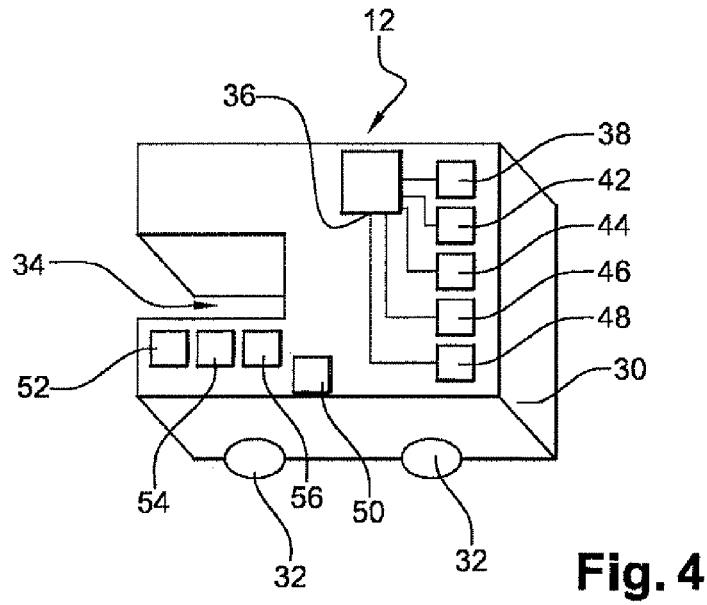
FIG. 4 is a diagrammatic view of an appliance used to implement the invention.

FIG. 1 shows an airport zone 2 invention is implemented. This zone 2 comprises for example an air terminal 4 for passenger in which the access to aircraft which in this case are intended for commercial service. Passengers can access the air terminal from outside the airport zone via a road 6, a car park 8 being provided to park road automotive vehicles near zone 2. Zone 2 shows aircraft 10 which in this case are aircraft like that illustrated at larger scale on FIG. 2. The airport zone 2 also shows appliances 12 like that illustrated on FIG. 4.

Figure 2:
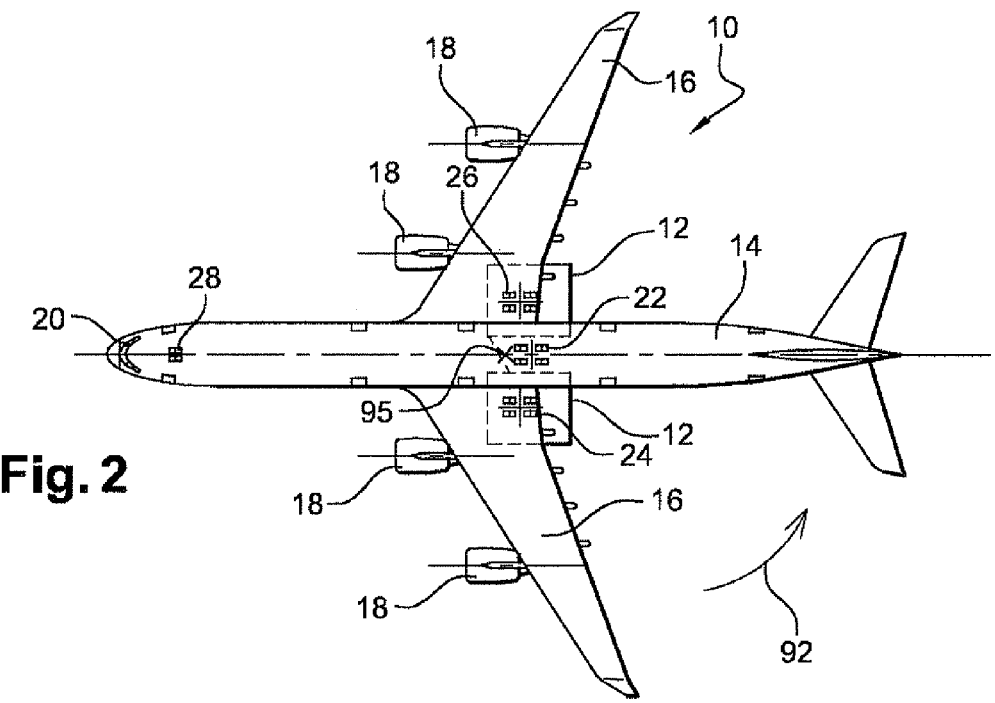
FIG. 2 is a plan view of an aircraft used when implementing the invention and of two appliances used to move this aircraft.

The aircraft 10, used to implement the invention, comprise for example, as illustrated on FIG. 2, a fuselage 14, two wings 16, and one or more engines 18. The aircraft illustrated therefore comprises four reactors 18 forming the engines. An aircraft cockpit 10 is installed at the front of the fuselage. The aircraft comprises several main landing gears. In this case, they are the central 22, left 24 and right 26 landing gears placed respectively under the fuselage, left wing and right wing, in the middle of the aircraft. The aircraft also comprises a nose landing gear 28 located under a front section of the fuselage. In this case, this landing gear has two twinned wheels.

We will first describe the appliances 12 which will be referred to in this case as "tractors". It is nevertheless understood that this term is not the opposite of the term "pusher". This type of appliance can therefore be designed to either pull or push the aircraft and to move the aircraft 10 forward or backward are required. Everything that will be explained below concerning the tractors 12 therefore applies more generally to appliances used to move aircraft along the ground in zone 2.

Appliance 12 is an automotive vehicle comprising a chassis 30 and wheels 32, for example four wheels. It has a position 34 to house or accommodate a wheel or landing gear of the aircraft 10. This housing is for example formed within a fork 34. The tractor 12 comprises an engine powerful enough to move all or part of an aircraft 10 as we will see below. In this case, the appliance 12 comprises a module forming electronic and computer control means 36. These means can control the movement of the appliance, in particular its direction of movement, steering, speed and acceleration. The appliance 12 comprises transmission and reception means 38 allowing it to communicate by radio waves with an identical appliance to transmit to this other appliance at least one datum relating to its position and/or to the movement of the appliance, and preferably data relating to the position, speed and acceleration of the appliance. These means also allow the appliance 12 to receive similar data from another appliance or other appliances. These communications take place between the appliances which cooperate to move the same aircraft, as we will see below. The control means 36 are connected to the transmission/reception means 38 so as to control the movement of the appliance 12 according to the position and movement of the other appliances.

In addition, the airport zone 2 comprises in this example beacons 40 distributed in various areas of the airport zone, in particular those where the appliances are likely to be driven. The appliance 12 comprises means 42 for detection and recognition of these beacons allowing it to determine its position with respect to the beacons located near the appliance. These means 42 are also connected to the means 36 so that the latter can control movement of the appliance according to the position determined by means of the beacons 40.

In this example, the appliance 12 also comprises means 44 allowing it to determine its position in the zone by means of a set of satellites, for example via the Global Positioning System (GPS). These means 44 connected to the means 36 also allow the vehicle to determine its position precisely in the airport zone. Through redundant use of means 42 and 44, the appliance knows its position accurately under all circumstances.

The appliance 12 comprises means 46 allowing it to know the orientation of a wheel or of the nose landing gear 28 of the aircraft which is associated with the appliance 12. For example, these could be shape recognition means comprising a camera. It could also be means receiving a command to maneuver this wheel or nose landing gear, command transmitted from the cockpit 20 by the pilot of the aircraft 10. The means 36 are connected to the means 46 so that the position and movement of the appliance 12 can be modified upon detection that the wheel or nose landing gear is turning. These means can also be used to take into account the position of the wheel or of the nose landing gear when controlling the movements of the vehicle.

In this example, the appliance 12 comprises means 48 allowing it to detect when an engine 18 of the aircraft associated with the appliance starts. These means are connected to the means 36 and allow the latter, when detection occurs, to instruct the vehicle 12 to separate from the aircraft 10 and move away from it.

In addition, the appliance 12 comprises means 50 capable of detecting, in a predetermined area around the vehicle 12, presence of a main landing gear of an aircraft. These means are connected to the means 36 and allow them to control, following this detection, a movement of the vehicle 12 to move it to a position where it can associate with the latter, for example by bringing the housing 34 around the landing gear detected in order to connect to it. The appliances could be designed to recognize the landing gears by means of a shape recognition technique.

In this example, the appliance 12 also comprises at least one camera and preferably two cameras 52, 54. One of them, the front camera, can film a zone where the appliance is approaching a wheel or a main landing gear of the aircraft, this approach being taken in this case in a relative direction insofar as it is the vehicle which, in practice, approaches the aircraft when the latter is stationary. The aim is therefore to film the zone which will contain the wheel or landing gear of the aircraft as it moves up to the housing 34. The other camera 54, the rear camera, can film the vehicle environment in the direction opposite to the aircraft, in this case at the back of the vehicle, so that the pilot controlling the appliance 12 can see the trajectory of the appliance while it is reversing.

Lastly, the appliance 12 comprises braking means 56 allowing it to brake the aircraft 10 when it is associated with the appliance.

Figure 3:
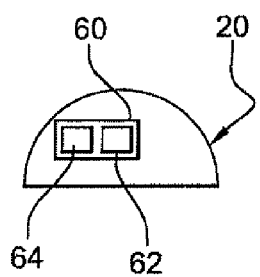
FIG. 3 is a simplified diagram of the cockpit of the aircraft shown on FIG. 2.

We will see that the aircraft 10 is moved along the ground in the airport zone by at least two appliances 12. In this example, the appliances 12 moving the aircraft 10 are controlled by the pilot in the cockpit 20 by means of a control element 60 in this cockpit. The control element is designed to translate the pilot's instructions into commands and transmit the commands preferably by radio and wireless to the appliances 12 connected to the aircraft. In reference to FIG. 3, the control element therefore comprises transmission/reception means 62. The control element can in particular control the appliances 12 associated with the aircraft 10 independently from each other but in a coordinated manner in order to move the aircraft by means of the appliances. The control element therefore receives from each appliance 12 data relating to their respective positions and movements. The control element 60 could comprise display means 64 such as a screen providing the pilot a view of the environment around the appliances 12, in particular behind them by means of the cameras 56 when the appliances are reversing.

Means 36, 38, 40, 42, 44, 46, 48, 50 and element 60 comprise electronic and/or computer components allowing them to offer the functionalities described herein. In case of computer components, they comprise at least one microprocessor, a clock, one or more memories, etc. The vehicles 12 and the control element 60 could therefore comprise at least one computer capable of implementing all or some of the functionalities indicated and all or part of the method according to the invention. In case of the element 60, this computer could be one of the computers on board the aircraft.

Again in reference to FIG. 1, the airport zone 2 comprises a take-off runway 70 and a landing runway which in this example is the same as the take-off runway. It comprises a zone 72 used as a parking zone for the aircraft 10 when they are at their parking points. At this point, the passengers can embark or disembark, for example via a direct access inside the air terminal 4 without going down onto the tarmac of the airport zone. The zone 72 is connected to the runway 70 by the entry 74 and exit 76 corridors, two in this case although there could be more. These corridors are configured and designed to be taken by the aircraft for their movement from the zone 72 to the runway and vice versa. In addition, the zone 2 comprises a road 78 dedicated to the appliances 12 and extending from a point 80 that is closer to the entry corridor 74 than to the exit corridor 76, and in this case adjacent to the entry corridor, up to a point 82 that is closer to the exit corridor 76 than to the entry corridor 74, and in this case adjacent to the exit corridor. The road 78 is in this case straight and parallel to the general direction of the runway 70. This means that the longitudinal direction of the road 78 is parallel to the longitudinal direction of the runway 70.

In addition, in this case, zone 2 comprises two parking zones 84a, 84b dedicated to the appliances 12. Each of these zones is separated from the runway 70 by a distance d, e less than half the length L of this runway, and preferably less than 20% of this length. The zone 84a is closer to the exit corridor 76 than to the entry corridor 74, while the other zone 84b is closer to the entry corridor 74 than to the exit corridor 76. In this case, each zone is rectangular in plan view and includes parking spaces for the appliances 12. Each of the two zones comprises permanent means 86 in the zone to supply energy to the appliances 12. In this respect, the appliances 12 can use energy sources such as diesel, natural gas, electricity, a hydrogen fuel cell or a hydrogen explosion engine. The means 86 supply the vehicles used in zone 2 with suitable energy.

We will now describe a mode for implementing the method according to the invention.

We assume that one of the aircraft 10, located at its parking point 90 in the zone 72, is ready to go to the runway 70 for take-off. We assume that its engines 18 are not started. The aircraft is therefore moved from point 90 up to point 80 of the entry corridor 74 for take-off by means of two of the appliances 12. These two separate appliances are connected to the aircraft independently from each other. In this case, two appliances are used to move the aircraft, the appliances being connected respectively to the left 24 and right 26 main landing gears of the aircraft. A greater number of appliances could be used, for example three or four, if justified by the size of the aircraft. The aircraft is moved by means of the left and right landing gears, in this example without using the nose landing gear 28. During this movement, the aircraft continues to roll along on all its landing gears. As a variant, however, the appliances 12 could be designed to lift the landing gear connecting them to the aircraft.

The appliances 12 are controlled by the aircraft pilot from the cockpit 20. The pilot transmits commands to the element 60 allowing it to control the movement of the appliances 12. A suitable control element including element 60 is therefore fitted in the aircraft for the pilot. The speed of each appliance is therefore controlled independently. The appliances communicate with each other so that their positions and speeds are known at all times. The element 60 therefore allows differential control of the appliances 12. In particular, differential control of the two appliances 12 allows the pilot to manage the turns. The appliances 12 can measure the turning of the nose landing gear. This datum is therefore taken into account for the trajectory and speed of the appliances 12 so that the turning of the wheel is coordinated with the speed of the appliances. The steering of the aircraft while moving could be controlled by the pilot exclusively by the nose landing gear steering command, which is detected by the appliances 12 and translated by the element 60 into suitable commands for the appliances 12.

For example, 90° turning of the landing gear is interpreted by the entire system as the command of a turn or a 180° turn on the spot of the aircraft. Under these conditions, one of the appliances, for example that associated with the right landing gear 26, goes forward while the other appliance, for example that associated with the left landing gear 24, goes backward, thereby pivoting the aircraft anticlockwise on FIG. 2 in the direction of the arrow 92 around a vertical geometric axis of rotation 95.

The pilot can use the cameras 54 of the appliances, or other cameras, to improve his visibility of the trajectory and the environment of the appliances and the aircraft as they move. As a replacement or as a complement, the pilot can be assisted by one or more operators on the ground who monitor the trajectory of the appliances and the aircraft and provide relevant information to the pilot.

During an initial reversing phase of the aircraft as it moves away from the air terminal from point 90, an operator on the ground could control the appliances instead of the pilot on board the aircraft. During this phase, in fact, the pilot on board the aircraft may not have sufficient visibility of the trajectory and environment of some parts of the aircraft, especially if there are no cameras. When the aircraft reaches a position from which it can be pulled forward by the appliances, they can be controlled by the pilot on board the aircraft who now has good visibility. At this position therefore, control is transferred from the operator on the ground to the pilot on board the aircraft. The pilot on board the aircraft could nevertheless control the appliances entirely, including during the reversing phase, for example if cameras provide sufficient visibility of the aircraft trajectory and of the appliances and their environment.

If necessary, the pilot can brake one of the appliances so that the aircraft moves more slowly. The appliances 12 determine their positions at all times in the airport zone by means of beacons 40 and the global positioning system.

As a variant, control of the appliances 12 could be fully automated, without any human intervention.

Once the appliances have taken the aircraft to point 80, the pilot starts the aircraft engines. The appliances 12 detect that the engines have started and therefore move automatically away from the aircraft. During this movement, the appliances film the landing gears to which they were respectively associated in order to check that the landing gears were not damaged while they were connected to the appliances. The appliances should preferably be uncoupled from the aircraft from the rear, i.e. the appliances reverse away from the aircraft.

On FIG. 1, the complete path, which in this case is not straight, of the aircraft from the parking point 90 to the runway entry at point 94, will be referred to as length C. It is not a distance as the crow flies equal to the distance between points 90 and 94, but the actual distance traveled by the aircraft along this path. The road 78 is positioned so that the length p of the partial path of the aircraft from point 80 to point 94 is less than half the length of path C, and preferably less than 25% of this length. Consequently, the aircraft was moved for most of the distance to runway 70 by the appliances 12, and moved independently over only a very small portion of the complete path.

Once each appliance has separated from the aircraft, the aircraft moves to the runway to complete the path and takes off on the runway. Each appliance 12 is driven to the parking zone 84a if spaces are available, and parked. If no spaces are available in zone 84a, the appliance is driven to zone 84b to park. During this last movement, each appliance therefore drives along the road 78 dedicated to the appliances without risk of meeting an aircraft. The characteristics of this road (e.g. dimensions and/or surface geometry) may make it unsuitable for aircraft or most aircraft. The appliance can be supplied with energy in the parking zone while it is parked, using means 86.

We now assume than an aircraft 10 has just landed on the runway 70 and must go to its parking point. The aircraft leaves the runway via the exit corridor 76 and stops at point 82. It can now stop its engines. Two of the appliances 12 parked in the zone 84a are driven towards the aircraft. When they detect the presence of the aircraft landing gear to which they are assigned, they move up to take a position in which they can move the aircraft, being connected to it as explained above. The appliances 12 then move the aircraft 10 from point 82 to point 90 or another point where the aircraft will be parked. If no appliances are available in the zone 84a, an appliance from the zone 84b is used.

We also know that after landing, a period of a few minutes (e.g. five minutes) is frequently planned while the aircraft engines run at low speed to allow them to cool before they are switched off. Point 82 could therefore be positioned at a suitable location to allow for this period. For example, point 82 could be located at a distance from the runway exit that the aircraft can reach by taxiing in about five minutes. Point 82 could therefore be located farther away from the runway than point 80.

For the same reasons as above, the length q of the partial path covered by the aircraft from the time it leaves the runway at point 92 up to point 82 is much shorter than the total length r of the complete path of the aircraft from the time it leaves the runway 70 up to its parking point 90. In this case, length q is even less than 25% of length r.

The aircraft can be towed by the appliances 12 by means of various techniques. The appliance could for instance lift the landing gear or the wheel and only be connected to the aircraft by the lifted tires. This technique is known as "tow bar less" or "nose lift towing". The "power push" technique could also be used, in which a system clamps an aircraft wheel between two rollers, one of the rollers being motorized in order to rotate the aircraft wheel.

Thanks to the road 78 or roads 78 when they are several in the zone 2, at least part of the movements of the appliances 12 do not congest the zone 72, which increases safety for the aircraft and the appliances.

Preferably, each appliance should be able to operate with different types of aircraft in order to limit the number of different appliances required and therefore reduce costs.

Since each appliance does not separate from the aircraft after making it reverse over a short distance from its parking point, there is no waiting or disconnection delay at this stage in the zone 72, which avoids congesting it.

The method according to the invention could be fully or partially automated and controlled by means of a computer program comprising code instructions able to control execution of the steps in this method when it is executed on a computer. This program could be saved on a data storage medium such as a CD or DVD, a memory or a hard disk. This type of program could also be made available on a telecommunication network for downloading, for example to allow updating when a new program version is available for use.

An operator could be responsible for managing the fleet of appliances 12 present in the zones 84a and 84b and/or driving along the road 78. He could also be responsible for instructing the appliances to separate from an aircraft or to start handling an aircraft.

Obviously, numerous modifications can be made without leaving the scope of the invention.

The engines of the aircraft could be left running once the appliances have started to handle it at point 82, or they could be started before separation at point 80.

The airport zone 2 could comprise several take-off and/or landing runways. When one runway is reserved for take-off and another for landing, the appliances could move the aircraft along an access corridor to the take-off runway, then after separation, drive along a road 78 to an exit corridor of the landing runway. One or more zones 78 could be planned on this road. The or each road 78 does not have to be straight.

The appliances could return directly to the zone 72 after leaving the aircraft at point 80, or they could go directly to point 82 from the zone 72 without driving along the road 78.

The area where the aircrafts are maneuvered by means of the appliances could be limited to the zone 72.

The invention claimed is:

1. A method for moving an aircraft, comprising:
moving the aircraft along the ground by means of at least two unmanned vehicles separable from the aircraft, and connected to the aircraft independently from each other.

2. A method for moving an aircraft, comprising:
moving the aircraft along the ground by means of at least two vehicles separable from the aircraft, and connected to the aircraft independently from each other or other vehicles,
wherein one part of the aircraft is pulled in a forward direction by one of the at least two vehicles and another part of the aircraft is pulled in a backward direction by another one of the at least two vehicles, and
wherein the movement by the at least two vehicles allows the aircraft to pivot about a single point.

3. A computer program embodied on a non-transitory computer readable medium, the computer program comprising:
instructions that can control execution of the step of moving an aircraft along the ground by means of at least two unmanned vehicles separable from the aircraft, and connected to the aircraft independently from each other.

4. An apparatus, comprising:
at least two identical, unmanned vehicles for moving an aircraft along the ground,
the at least two identical, unmanned vehicles being separable from the aircraft and connected to the aircraft independently from each other,
a first one of the at least two identical, unmanned vehicles being capable of communicating with a second one of the at least two identical, unmanned vehicles in order to perform at least one of transmitting or receiving at least one datum relating to at least one of a position or a movement of one of the at least two identical, unmanned vehicles.

5. An apparatus, comprising:
at least two identical vehicles for moving an aircraft along the ground,
the at least two identical vehicles being separable from the aircraft and connected to the aircraft independently from each other or other vehicles,
a first one of the at least two identical vehicles being capable of communicating with a second one of the at least two vehicles in order to perform at least one of transmitting or receiving at least one datum relating to at least one of a position or a movement of one of the at least two identical vehicles,
wherein the apparatus can detect that an engine of an aircraft being moved by at least one of the vehicles has started and,
due to this detection, control a movement of the at least one of the vehicles in a direction away from the aircraft.

6. An apparatus, comprising:
at least two identical vehicles for moving an aircraft along the ground,
the at least two identical vehicles being separable from the aircraft and connected to the aircraft independently from each other or other vehicles,
a first one of the at least two identical vehicles being capable of communicating with a second one of the at least two identical vehicles in order to perform at least one of transmitting or receiving at least one datum relating to at least one of a position or a movement of one of the vehicles,
wherein the apparatus can detect presence of an aircraft landing gear in a predetermined zone away from at least one of the at least two identical vehicles and,
further to this detection, take up a position where it can move the aircraft.

7. An apparatus, comprising:
at least two identical vehicles for moving an aircraft along the ground,
the at least two identical vehicles being separable from the aircraft and connected to the aircraft independently from each other or other vehicles,
a first one of the at least two identical vehicles being capable of communicating with a second one of the at least two identical vehicles in order to perform at least one of transmitting or receiving at least one datum relating to at least one of a position or a movement of one of the vehicles,
the apparatus further comprising means
to detect when a nose wheel of the aircraft turns and
to modify at least one of a position or a movement of at least one of the at least two identical vehicles according to this detection.

8. A control element comprising:
a processor,
the processor for moving an aircraft along the ground by means of at least two unmanned vehicles separable from the aircraft, and connected to the aircraft independently from each other,
wherein the control element can send instructions to the at least two unmanned vehicles in order to move the aircraft along the ground by means of the at least two unmanned vehicles.

9. The control element according to claim 8, wherein the control element can control at least one of the at least two unmanned vehicles according to at least one datum relating to at least one of a position or a movement of the other vehicle or of at least one of the other unmanned vehicles.

10. An aircraft comprising:
a control element comprising a processor for moving an aircraft along the ground by means of at least two unmanned vehicles separable from the aircraft, and connected to the aircraft independently from each other,
wherein the control element can send instructions to the at least two unmanned vehicles in order to move the aircraft along the ground by means of the at least two unmanned vehicles.

* * * * *